(12) United States Patent
Doggett (10) Patent No.: US 10,691,894 B2
(45) Date of Patent: Jun. 23, 2020

(54) NATURAL POLITE LANGUAGE GENERATION SYSTEM

(71) Applicant: Disney Enterprises, Inc., Burbank, CA (US)

(72) Inventor: Erika Doggett, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/968,685

(22) Filed: May 1, 2018

(65) Prior Publication Data

US 2019/0340238 A1 Nov. 7, 2019

(51) Int. Cl.
*G06F 17/27* (2006.01)
*G06N 3/08* (2006.01)
(Continued)

(52) U.S. Cl.
CPC .......... *G06F 40/30* (2020.01); *G06F 16/3329* (2019.01); *G06F 16/3344* (2019.01); *G06F 40/268* (2020.01); *G06F 40/56* (2020.01); *G06N 3/08* (2013.01); *G10L 15/22* (2013.01); *G10L 2015/225* (2013.01)

(58) Field of Classification Search
CPC .............. G10L 15/22; G10L 2015/221; G10L 2015/225; G10L 2015/227; G10L 15/265; G06F 17/2755; G06F 17/2785; G06F 17/2881
See application file for complete search history.

(56) References Cited

U.S. PATENT DOCUMENTS 6,484,155 B1 * 11/2002 Kiss ................. G06N 5/043
706/46
7,991,724 B2 8/2011 Antebi et al.
(Continued)

OTHER PUBLICATIONS

Gupta, Swati, "Generating Politeness for Conversational Systems Aimed to Teach English as a Second Language," Department of Computer Science, University of Sheffield, United Kingdom, Sep. 30, 2009.
(Continued)

*Primary Examiner* — Eric Yen
(74) *Attorney, Agent, or Firm* — Artegis Law Group, LLP (57) ABSTRACT

A process receives a user input in a human-to-machine interaction. The process generates, with a natural language generation engine, one or more response candidates. Further, the process measures, with the natural language generation engine, the semantic similarity of the one or more response candidates. In addition, the process selects, with the natural language generation engine, a response candidate from the one or more response candidates. The process measures, with the natural language generation engine, an offensiveness measurement and a politeness measurement of the selected response. The process determines, with the natural language generation engine, that the offensiveness measurement or the politeness measurement lacks compliance with one or more predefined criteria. The process selects, with the natural language generation engine, an additional response candidate from the one or more response candidates that has a higher semantic similarity measurement than remaining response candidates from the one or more response candidates.

20 Claims, 4 Drawing Sheets

(51) Int. Cl.
*G06F 16/332* (2019.01)
*G06F 16/33* (2019.01)
*G06F 17/28* (2006.01)
*G10L 15/22* (2006.01)
*G06F 40/30* (2020.01)
*G06F 40/56* (2020.01)
*G06F 40/268* (2020.01)

(56) References Cited

U.S. PATENT DOCUMENTS

| | | | | |
|---|---|---|---|---|
| 8,032,355 | B2 | 10/2011 | Narayanan et al. | |
| 8,121,845 | B2* | 2/2012 | Kirby | G06F 16/9535 704/273 |
| 8,463,595 | B1 | 6/2013 | Rehling et al. | |
| 8,645,300 | B1* | 2/2014 | Cowdrey | G06F 16/95 706/46 |
| 8,719,016 | B1* | 5/2014 | Ziv | G10L 15/26 704/235 |
| 8,737,817 | B1* | 5/2014 | Izo | H04N 5/76 386/287 |
| 9,244,911 | B2* | 1/2016 | Allen | G06F 17/2785 |
| 9,405,741 | B1* | 8/2016 | Schaaf | G10L 15/08 |
| 9,703,871 | B1* | 7/2017 | Das | G06F 16/9535 |
| 2008/0133245 | A1* | 6/2008 | Proulx | G06F 17/2818 704/277 |
| 2008/0154828 | A1* | 6/2008 | Antebi | G06N 5/022 706/46 |
| 2010/0049696 | A1* | 2/2010 | Lokshin | G06F 16/29 701/533 |
| 2011/0071826 | A1* | 3/2011 | Ma | G06F 16/3343 704/235 |
| 2012/0035907 | A1* | 2/2012 | Lebeau | G06F 17/28 704/2 |
| 2012/0197629 | A1* | 8/2012 | Nakamura | G06F 17/289 704/3 |
| 2013/0238318 | A1* | 9/2013 | Enoki | G06F 17/277 704/9 |
| 2014/0136200 | A1* | 5/2014 | Winter | G10L 15/07 704/244 |
| 2015/0279391 | A1* | 10/2015 | Onishi | G10L 25/63 704/254 |
| 2017/0024461 | A1* | 1/2017 | Mac an tSaoir | G06F 16/3338 |
| 2019/0103102 | A1* | 4/2019 | Tseretopoulos | G10L 15/22 |
| 2019/0220505 | A1* | 7/2019 | Shinohara | G06F 40/30 |
| 2019/0244609 | A1* | 8/2019 | Olabiyi | G06F 40/35 |

OTHER PUBLICATIONS

Papegnies, Etienne, et al., "Impact of Content Features for Automatic Online Abuse Detection," LIA—University of Avignon (France), Apr. 11, 2017.

Van Der Zwaan, J.M., "An Empathetic Virtual Buddy for Social Support," Mar. 10, 2014.

Vogel, Carl, "Some Puzzles of Politeness and Impoliteness Within a Formal Semantics of Offensive Language," Conflict and Multimodal Communication, Chapter 12, pp. 223-241.

Aubakirova, Malika, et al., "Interpreting Neural Networks to Improve Politeness Comprehension," Oct. 9, 2016.

Daqnescu-Niculescu-Mizil, Cristian, et al., "A Computational Approach to Politeness with Application to Social Factors," Computer Science Department, Linguistics Department, Stanford University, Max Planck Institute, Jun. 25, 2013.

Davidson, Thomas, et al. "Automated Hate Speech Detection and the Problem of Offensive Language," Department of Sociology, Cornell University, Department of Applied Mathematics, Cornell University, Department of Information Science, Cornell University, Qatar Computing Research Institute, Mar. 11, 2017.

Niculae, Vlad, et al., "Linguistic Harbingers of Betrayal: A Case Study on an Online Strategy Game," Cornell University, University of Maryland, and University of Colorado, Jun. 15, 2015.

Mojica, Luis Gerardo, "A Trolling Hierarchy in Social Media and a Conditional Random Field for Trolling Detection," The University of Texas at Dallas, Apr. 7, 2017.

* cited by examiner

NATURAL POLITE LANGUAGE GENERATION SYSTEM

BACKGROUND

1. Field

This disclosure generally relates to the field of computing systems. More particularly, the disclosure relates to artificial intelligence ("AI") systems.

2. General Background

Some current AI systems allow for the use of natural language generation ("NLG") when interacting with users. NLG has been incorporated into conversations (written or oral) between a computerized system and a human user in a manner of speaking to which the human user is accustomed. Yet, such systems often provide a disincentive to human user participation when using what is deemed to be offensive language to many human users. For example, current generative language chatbots have been prone to being directed by some human users, whether purposefully or accidentally, toward producing offensive language. As a result, deployment of NLG AI systems for use with practical applications has been somewhat limited.

SUMMARY

In one aspect, a computer program product comprises a non-transitory computer readable storage device having a computer readable program stored thereon. The computer readable program when executed on a computer causes the computer to receive, with a processor, a user input in a human-to-machine interaction. Further, the computer is caused to generate, with an NLG engine, one or more response candidates. In addition, the computer is caused to measure, with the NLG engine, the semantic similarity of the one or more response candidates. The computer is also caused to select, with the NLG engine, a response candidate from the one or more response candidates.

Further, the computer is caused to measure, with the NLG engine, an offensiveness measurement and a politeness measurement of the selected response. In addition, the computer is caused to determine, with the NLG engine, that the offensiveness measurement or the politeness measurement lacks compliance with one or more predefined criteria.

The computer is also caused to select, with the NLG engine, an additional response candidate from the one or more response candidates that has a higher semantic similarity measurement than remaining response candidates from the one or more response candidates. Further, the computer is caused to measure, with the NLG engine, an additional offensiveness measurement and an additional politeness measurement of the selected response. In addition, the computer is caused to output, with the NLG engine, the selected additional response candidate based upon a determination that the selected additional response candidate complies with the additional offensiveness measurement and the additional politeness measurement.

In another aspect, an apparatus has a processor that performs the functionality of the computer readable program. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

An NLG AI system is provided to perform simultaneous measurements of offensiveness and politeness during one or more interactions between the NLG AI system and a human user. If the NLG AI system determines that a machine-generated response in a human-to-machine interaction does not meet predetermined thresholds associated with the offensiveness and politeness measurements, the NLG system performs a machine learning ranking and selection process to select a more appropriate response.

Figure 1:
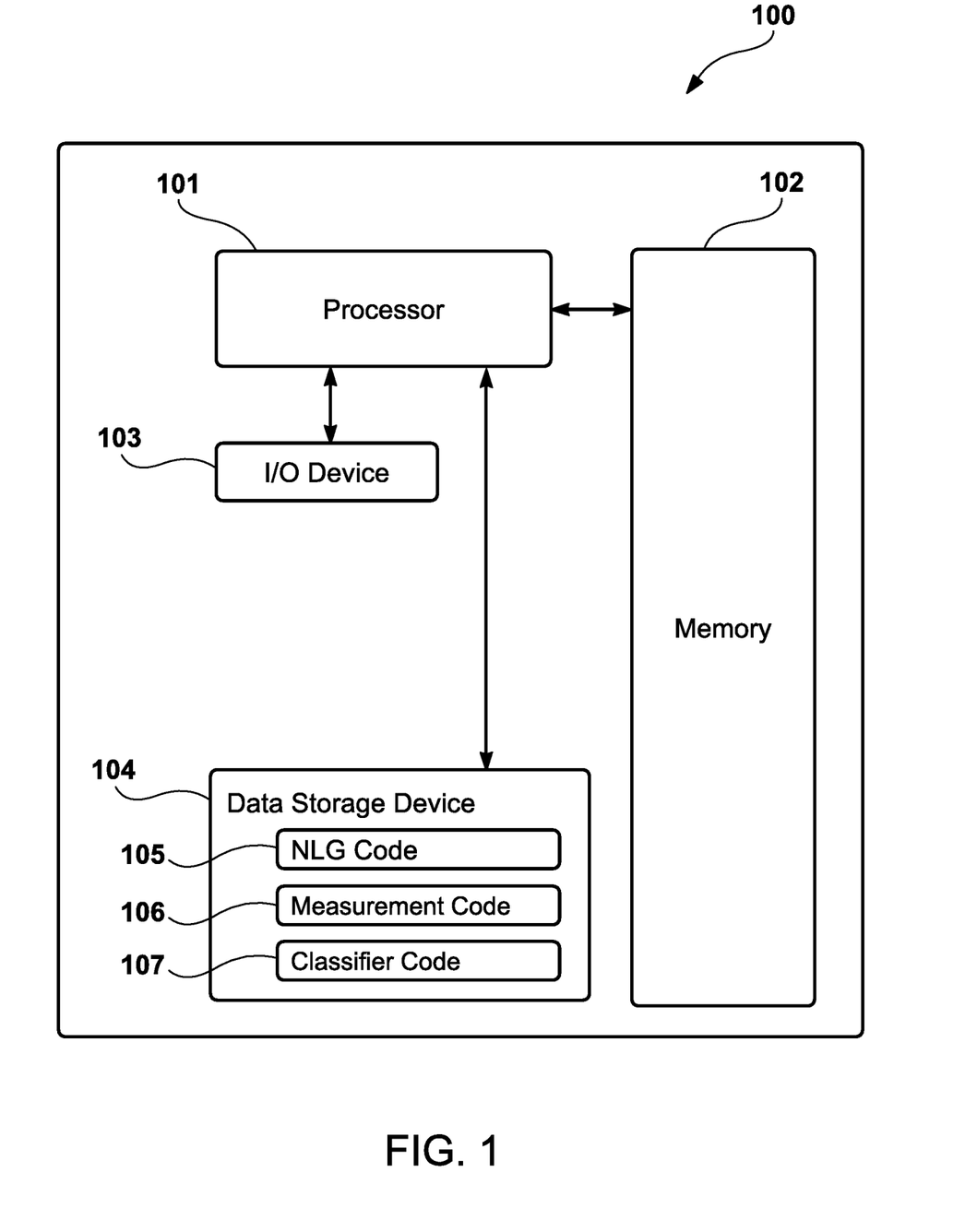
FIG. 1 illustrates a block diagram of the internal components of an NLG engine that is used to generate automated responses in a human-to-machine interaction.

FIG. 1 illustrates a block diagram of the internal components of an NLG engine 100 that is used to generate automated responses in a human-to-machine interaction. The NLG engine 100 has a processor 101, a memory 102, an input/output ("I/O") device 103 (e.g., microphone, keyboard, mouse, pointer, camera, display device, etc.), and a data storage device 104.

Further, the data storage device 104 stores thereon NLG code 105, measurement code 106, and classifier code 107. The processor 101 executes the NLG code 105 to generate semantically ordered text output candidates (delivered via text and/or voice) in response to a human interaction received as an input through the I/O device 103. Further, the processor 101 executes the measurement code 106 to simultaneously, or substantially simultaneously (defined herein as a time constraint selected from a range of one millisecond to sixty seconds), measure the offensiveness and politeness of an output candidate. The offensiveness measurement may be based on a model for offensiveness, whereas the politeness measurement may be based on a model for politeness; each model assigns a score for its respective measurement. The processor 101 may use the same model, or different models, to generate the offensiveness and politeness scores. The processor 101 may also execute the measurement code 106 to measure the semantic similarity between text output candidates generated by the NLG code 105.

In addition, the processor 101 may execute classifier code 107 to determine whether both offensiveness and politeness measurements for a response candidate meets offensiveness and politeness threshold criteria. If the classifier code 107 determines that both the offensiveness and politeness threshold criteria are met, the response candidate is selected for a response to the human interaction; otherwise, the classifier code 107 reroutes the NLG engine 100 to the next most similar generated response, as determined by the measurement code 106, for offensiveness and politeness measurements.

In one aspect, the NLG engine 100 may be composed according to a fully generative model (e.g., sequence-tosequence neural network model). In another aspect, the NLG engine 100 may composed according to a retrieval-based model that retrieves response candidates from a database of existing grammatical language responses and predicts/selects the most semantically appropriate response to match a question/comment from the user. In yet another aspect, a hybrid of the two aforementioned models (fully generative and retrieval-based) may be used to compose the NLG engine 100. Accordingly, the NLG engine 100 generates responses without a pre-scripted narrative.

Previous configurations relied on a predetermined list of scripted responses to a human interaction, which necessitated extensive retraining of the AI upon an instance of offensiveness or impoliteness. In contrast, the NLG engine 100 of the present application avoids the resource-intensive and time-consuming retraining of an entire system. For instance, the scripted narrative approach of previous configurations necessitated a full re-write for each new project or topic of conversation. But use of an NLG model by the NLG engine 100 results in a more flexible system that may be repurposed to multiple projects and topics with far less repeated development work. In other words, the NLG engine 100 allows for a broader range of dialogue responses to be automatically generated; thereby explicitly controlling politeness and offensiveness to prevent trolling without rewriting an entire model.

To further elaborate, the NLG engine 100 is flexible in that the NLG model may be swapped out to produce responses for a new topic or project. The rest of the system architecture for the NLG engine 100 may remain the same so that the determination of the offensiveness and politeness also remain the same.

On the other hand, thresholds for offensiveness and politeness may be changed and adjusted for different topics or communities without changing the NLG model. Accordingly, different politeness personas of the NLG AI system may be generated without retraining the NLG engine 100. For instance, two different politeness personas of the NLG AI system may be built to converse about the same topic, but the first politeness persona may be configured to be more conscientiously polite, whereas the second politeness persona may be neutral.

Figure 2:
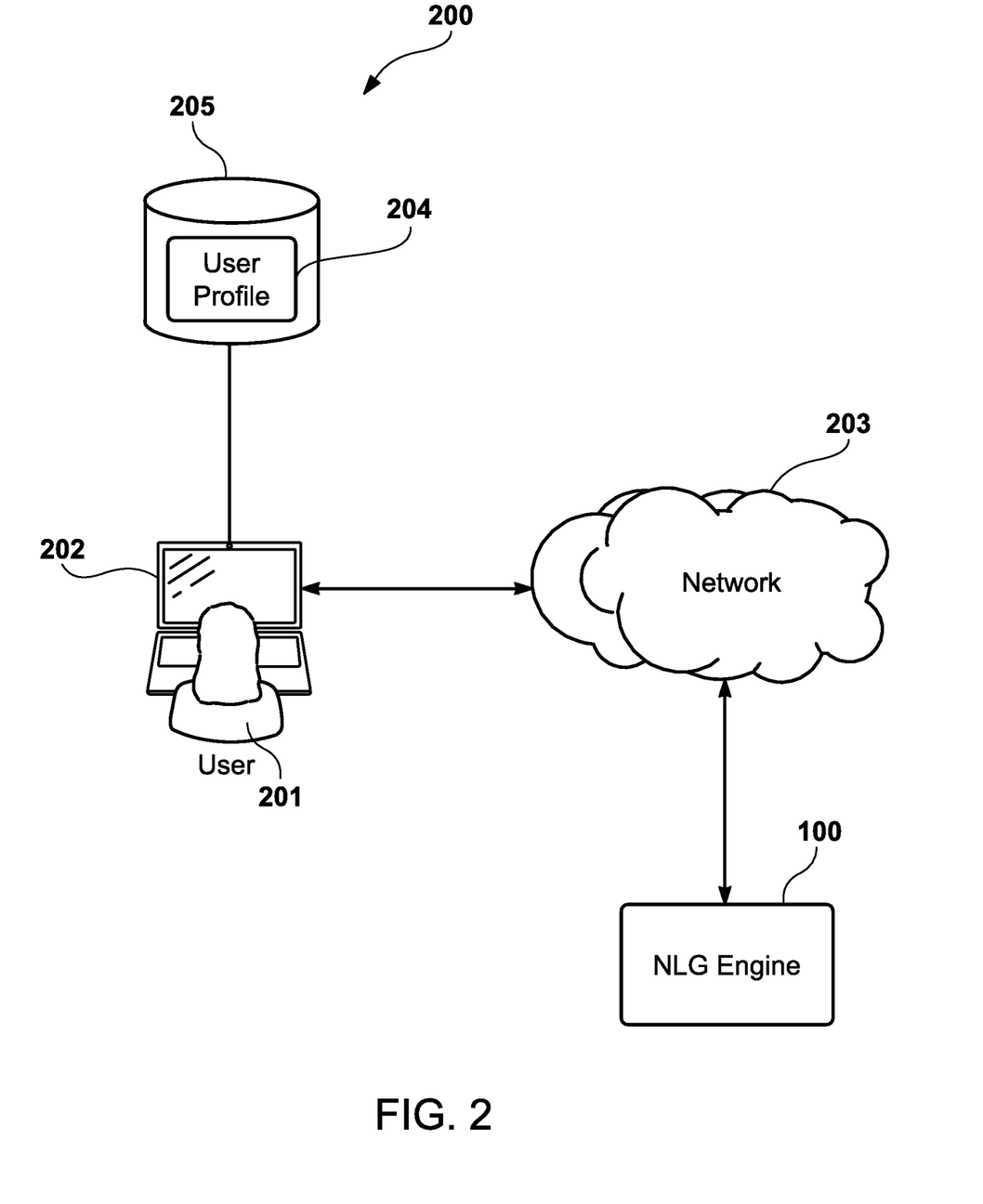
FIG. 2 illustrates an NLG system configuration in which a user uses a computing device to have a human-to-machine interaction with the NLG engine through a network.

FIG. 2 illustrates an NLG system configuration 200 in which a user 201 uses a computing device 202 (e.g., personal computer, laptop computer, etc.) to have a human-to-machine interaction with the NLG engine 100 through a network 203. The NLG engine 100 may rely not only on predetermined threshold requirements for offensive language and politeness being met when selecting a response candidate, but also real-time cues provided from the user 201. For example, the NLG engine 100 may determine that a response meets the predetermined offensiveness and politeness criteria, but that a particular user 201 provided a negative cue (e.g., verbal statement, sound, physical movement, etc.) with respect to the selected response. The negative cue may be detected by one or more sensors such as the I/O device 103 (FIG. 1). The NLG engine 100 may then activate an apology function, rephrasing function, or conversation redirection function.

In addition, the NLG engine 100 may access a user profile 204, which may be stored in a database 205, of the user 201 to determine a social context of the human-to-machine interaction and adjust the politeness and offensiveness criteria in a manner consistent with that social context. For example, language that may not be offensive to one user 201 may be offensive to another user 201. By adjusting politeness and offensiveness criteria based on the user profile 204, the NLG engine 100 effectively adapts to different users to provide a user experience that is polite and not offensive.

Accordingly, in one aspect, the NLG system configuration 200 effectively monitors and controls the system-generated responses produced by the NLG engine 100 during a dialogue with the user 201. In another aspect, the NLG system configuration uses the measurement code 106 (FIG. 1) to generate politeness and offensiveness metrics for user-generated responses provided by the user 201 during the dialogue with the NLG engine 100.

Figure 3:
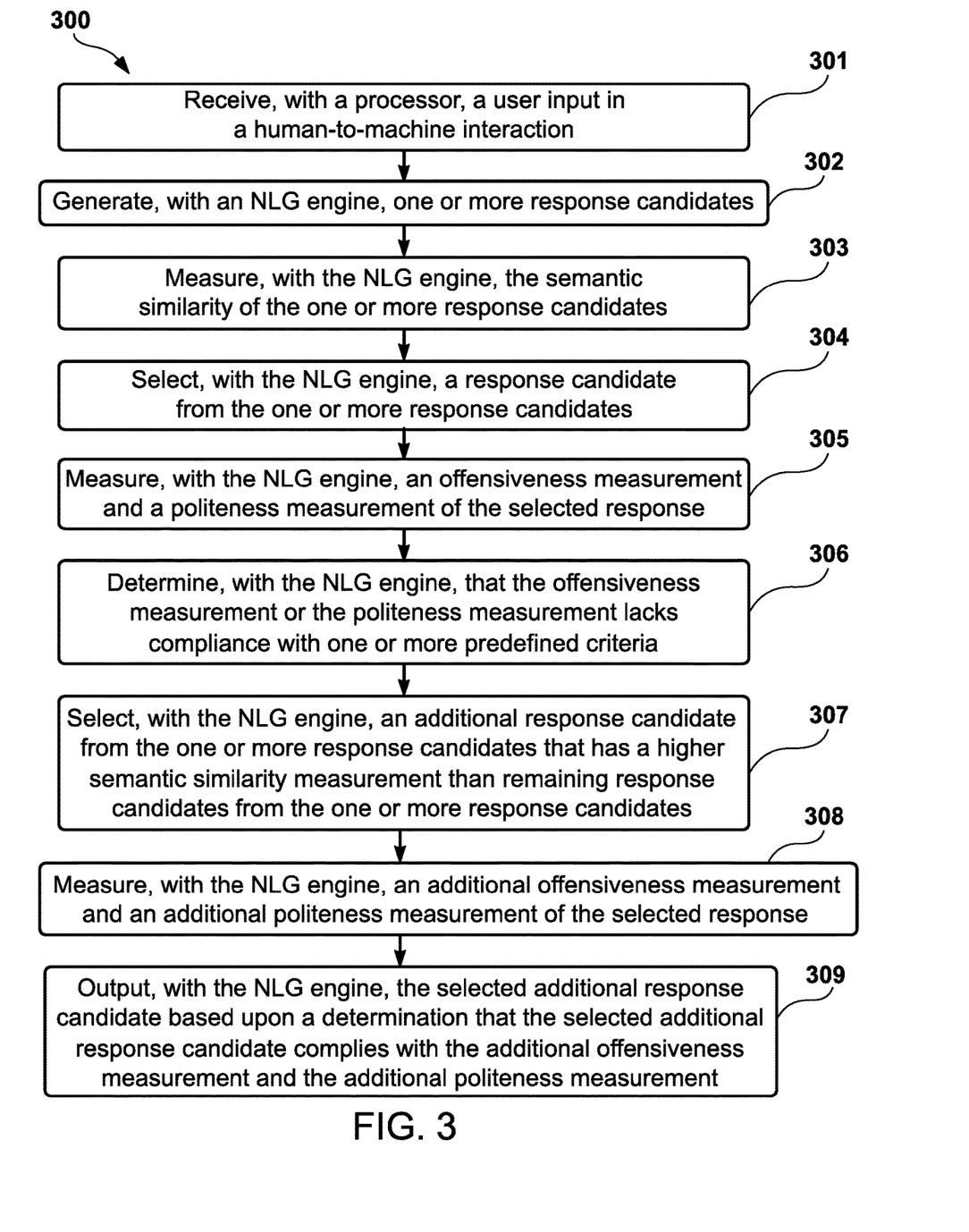
FIG. 3 illustrates a process that may be used by the NLG engine illustrated in FIGS. 1 and 2 to control and monitor responses to the user illustrated in FIG. 2 during a dialogue with the user.

FIG. 3 illustrates a process 300 that may be used by the NLG engine 100 illustrated in FIGS. 1 and 2 to control and monitor responses to the user 201 illustrated in FIG. 2 during a dialogue with the user 201. At a process block 301, the process 300 receives, with the processor 101 (FIG. 1), a user input in a human-to-machine interaction. Additionally, at a process block 302, the process 300 generates, with the NLG engine 100, one or more response candidates. Further, at a process block 303, the process 300 measures, with the NLG engine 100, the semantic similarity of the one or more response candidates. In addition, at a process block 304, the process 300 selects, with the NLG engine 100, a response candidate from the one or more response candidates. At a process block 305, the process 300 measures, with the NLG engine 100, an offensiveness measurement and a politeness measurement of the selected response. Further, at a process block 306, the process 300 determines, with the NLG engine 100, that the offensiveness measurement or the politeness measurement lacks compliance with one or more predefined criteria. At a process block 307, the process 300 selects, with the NLG engine 100, an additional response candidate from the one or more response candidates that has a higher semantic similarity measurement than remaining response candidates from the one or more response candidates. Further, at a process block 308, the process 300 measures, with the NLG engine 100, an additional offensiveness measurement and an additional politeness measurement of the selected response. In addition, at a process block 309, the process 300 outputs, with the NLG engine 100, the selected additional response candidate based upon a determination that the selected additional response candidate complies with the additional offensiveness measurement and the additional politeness measurement.

In one aspect, the process 300 is self-controlled and self-monitored by the NLG engine 100 (FIGS. 1 and 2). In another embodiment, a control and monitor engine, which is distinct from the NLG engine 100, performs the control and monitor functionality to ensure that the NLG engine 100 is generating responses that are polite and not offensive.

Figure 4:
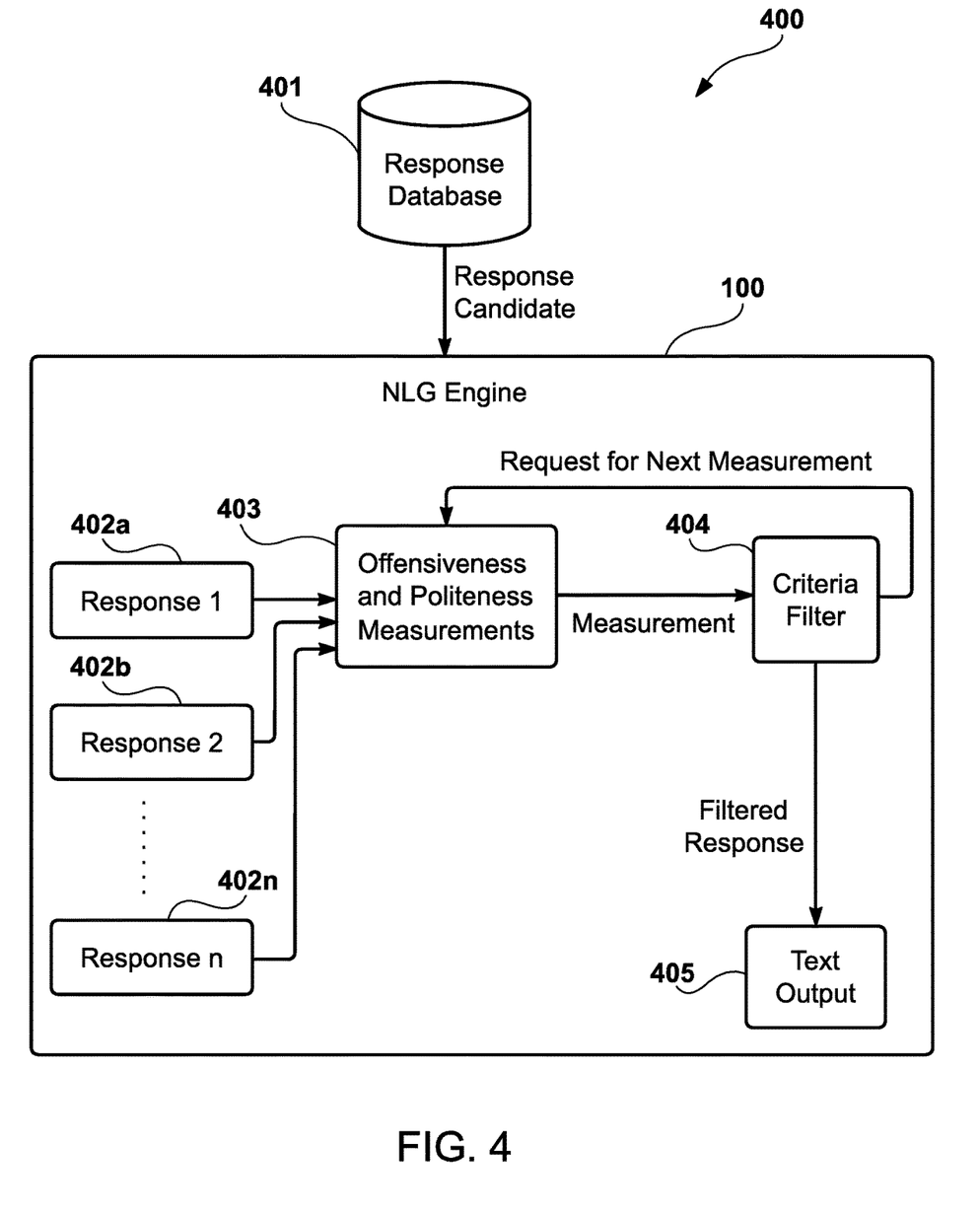
FIG. 4 illustrates a logic model for the implementation of the process illustrated in FIG. 3 by the NLG engine illustrated in FIG. 1.

FIG. 4 illustrates a logic model 400 for the implementation of the process 300 illustrated in FIG. 3 by the NLG engine 100 illustrated in FIG. 1. As an example, the NLG engine 100 is depicted as retrieving response candidates 402a-402n from a response database 401. The NLG engine 100 selects the most semantically appropriate response candidates to match the question or comment from the user 201 (FIG. 2) during the human-to-machine interaction. Further, in one aspect, the NLG engine 100 generates a semantic ordering (e.g., ranking) of the response candidates 402a-402n.

The logic model 400 also illustrates a criteria loop that may be used by the NLG engine 400 to evaluate the current highest ranking response candidate based on offensiveness and politeness. For instance, the first semantically ordered response candidate 402a may be evaluated as having an offensiveness value of x and a politeness value of y. The offensiveness and politeness measurements 403 are then analyzed by the NLG engine 100, with a criteria filter 404, to determine if the offensiveness and politeness measurements 403 meet one or more predetermined criteria (e.g., threshold offensiveness and politeness values).

In one aspect, the NLG engine 100 mandates that each of the offensiveness and politeness measurements meet its corresponding criteria, which may be predetermined. In another aspect, the NLG engine 100 uses a sliding criteria analysis to determine criteria compliance. For instance, if the offensiveness measurement lacks compliance for the acceptable offensiveness threshold within a certain percentage margin, and at the same time the politeness measurement exceeds above and beyond the acceptable politeness minimum value, the NLG engine 100 may deem the response to be within an acceptable sliding window value (i.e., the gains from one measurement may outweigh the losses from the other measurement) according to the criteria filter 404. Vice versa, if the politeness measurement does not meet the acceptable minimum value, but the offensiveness measurement is far below the set acceptable threshold, the response may be deemed likewise within the acceptable sliding window value according to the criteria filter 404. The NLG engine 100 may then generate text output 405 or other form of output (e.g., voice, video, etc.).

If the NLG engine 100 determines, at the criteria filter 404, that a response candidate 402 does not comply with the criteria, the NLG engine 100 discards the response candidate 402 and proceeds to analyze the next response candidate ranked in the semantically ordered response candidates (e.g., response candidate 402b). The NLG engine 100 continues processing the criteria loop until a response candidate meets the predefined criteria at the criteria filter 404 or until all response candidates have been discarded.

In contrast with configurations that analyze all response candidates, the NLG engine 100 may use a criteria loop to analyze only one response candidate at a time. If one of the highest ranked response candidates complies with the criteria, the remaining response candidates in the list of semantically ordered response candidates may be discarded. Accordingly, the NLG engine 100 improves the functioning of a computer by reducing memory requirements.

Further, the NLG engine 100 uses a rules-based approach that improves the functioning of a computer. For example, the NLG engine 100 uses specific metrics (e.g., offensiveness and politeness) for response candidate filtering after response candidate selection based on semantic matching and ordering. The aforementioned rules-based configuration allows the NLG engine 100 to effectively control and monitor system-generated responses in a specific manner that improves the functioning of a computer.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A computer program product comprising a non-transitory computer readable storage device having a computer readable program stored thereon, wherein the computer readable program when executed on a computer causes the computer to:

receive, with a processor, a user input in a human-to-machine interaction;

generate, with a natural language generation engine, a plurality of response candidates;

measure, with the natural language generation engine, a semantic similarity of the plurality of response candidates to the user input;

select, with the natural language generation engine, a response candidate from the plurality of response candidates as a selected response candidate;

measure, with the natural language generation engine, an offensiveness measurement and a politeness measurement of the selected response candidate;

determine, with the natural language generation engine, whether the offensiveness measurement or the politeness measurement complies with one or more criteria;

responsive to a determination that the offensiveness measurement and the politeness measurement comply with the one or more criteria, output, with the natural language generation engine, the selected response candidate; and responsive to a determination that the offensiveness measurement and the politeness measurement do not comply with the one or more criteria;

select, with the natural language generation engine, an additional response candidate from the plurality of response candidates, as a selected additional response candidate, the selected additional response candidate having a higher semantic similarity measurement than remaining response candidates from the plurality of response candidates;

measure, with the natural language generation engine, an additional offensiveness measurement and an additional politeness measurement of the selected additional response candidate;

determine, with the natural language generation engine, that the additional offensiveness measurement and the additional politeness measurement comply with the one or more criteria; and output, with the natural language generation engine, the selected additional response candidate.

2. The computer program product of claim 1, wherein the computer is further caused to determine a social context of the human-to-machine interaction based on a user profile corresponding to a user associated with the user input.

3. The computer program product of claim 2, wherein the computer is further caused to modify the one or more criteria based on the user profile.

4. The computer program product of claim 1, wherein the computer is further caused to:
receive a negative user cue that is distinct from the one or more criteria; and perform one of the following:
responsive to the determination that the offensiveness measurement and the politeness measurement comply with the one or more criteria, modify the selected response candidate based on the negative user cue, or
responsive to the determination that the additional offensiveness measurement and the additional politeness measurement comply with the one or more criteria, modify the selected additional response candidate based on the negative user cue.

5. The computer program product of claim 4, wherein the negative user cue comprises a verbal statement, a sound, or a physical movement.

6. The computer program product of claim 4, wherein the computer is further caused to modify the selected response candidate or the selected additional response candidate according to a process comprising activating an apology mechanism that follows the selected response candidate, rephrasing the selected response candidate, or redirecting the human-to-machine interaction.

7. The computer program product of claim 1, wherein the natural language generation engine is based on a sequence-to-sequence neural network without a pre-scripted narrative.

8. The computer program product of claim 1, wherein the natural language generation engine is based on a retrieval-based configuration without a pre-scripted narrative.

9. A method comprising:
receiving, with a processor, a user input in a human-to-machine interaction;
generating, with a natural language generation engine, a plurality of response candidates;
measuring, with the natural language generation engine, a semantic similarity of the plurality of response candidates to the user input;
selecting, with the natural language generation engine, a response candidate from the plurality of response candidates as a selected response candidate;
measuring, with the natural language generation engine, an offensiveness measurement and a politeness measurement of the selected response candidate;
determining, with the natural language generation engine, whether the offensiveness measurement or the politeness measurement complies with one or more criteria;
responsive to a determination that the offensiveness measurement and the politeness measurement comply with the one or more criteria, outputting, with the natural language generation engine, the selected response candidate; and
responsive to a determination that the offensiveness measurement and the politeness measurement do not comply with the one or more criteria:
selecting, with the natural language generation engine, an additional response candidate from the plurality of response candidates, as a selected additional response candidate, the selected additional response candidate having a higher semantic similarity measurement than remaining response candidates from the plurality of response candidates;
measuring, with the natural language generation engine, an additional offensiveness measurement and an additional politeness measurement of the selected additional response candidate;
determining, with the natural language generation engine, that the additional offensiveness measurement and the additional politeness measurement comply with the one or more criteria; and
outputting, with the natural language generation engine, the selected additional response candidate.

10. The method of claim 9, further comprising determining a social context of the human-to-machine interaction based on a user profile corresponding to a user associated with the user input.

11. The method of claim 10, further comprising modifying the one or more criteria based on the user profile.

12. The method of claim 9, further comprising:
receiving a negative user cue that is distinct from the one or more criteria; and
performing one of the following:
responsive to the determination that the offensiveness measurement and the politeness measurement comply with the one or more criteria, modifying the selected response candidate based on the negative user cue, or
responsive to the determination that the additional offensiveness measurement and the additional politeness measurement comply with the one or more criteria, modifying the selected additional response candidate based on the negative user cue.

13. The method of claim 12, wherein the negative user cue comprises a verbal statement, a sound, or a physical movement.

14. The method of claim 12, wherein modifying the selected response candidate or the selected additional response candidate comprises activating an apology mechanism that follows the selected response candidate, rephrasing the selected response candidate, or redirecting the human-to-machine interaction.

15. The method of claim 9, wherein the natural language generation engine is based on a sequence-to-sequence neural network without a pre-scripted narrative.

16. The method of claim 9, wherein the natural language generation engine is based on a retrieval-based configuration without a pre-scripted narrative.

17. An apparatus comprising:
a processor configured to:
receive a user input in a human-to-machine interaction;
generate a plurality of response candidates;
measure a semantic similarity of the plurality of response candidates to the user input;
select a response candidate from the plurality of response candidates as a selected response candidate;
measure an offensiveness measurement and a politeness measurement of the selected response candidate
determine whether the offensiveness measurement or the politeness measurement complies with one or more criteria;
responsive to a determination that the offensiveness measurement and the politeness measurement comply with the one or more criteria, output, with the natural language generation engine, the selected response candidate; and
responsive to a determination that the offensiveness measurement or the politeness measurement does not comply with the one or more criteria:
select an additional response candidate from the plurality of response candidates, as a selected additional response candidate, the selected additional response candidate having a higher semantic similarity measurement than remaining response candidates from the plurality of response candidates;

measure an additional offensiveness measurement and an additional politeness measurement of the selected additional response candidate determine, with the natural language generation engine, that the additional offensiveness measurement and the additional politeness measurement comply with the one or more criteria; and output the selected additional response candidate.

18. The apparatus of claim 17, wherein the processor is further configured to determine a social context of the human-to-machine interaction based on a user profile corresponding to a user associated with the user input.

19. The apparatus of claim 18, wherein the processor is further configured to modify the one or more criteria based on the user profile.

20. The apparatus of claim 17, wherein the processor is further configured to:

receive a negative user cue that is distinct from the one or more criteria; and perform one of the following:

responsive to the determination that the offensiveness measurement and the politeness measurement comply with the one or more criteria, modify the selected response candidate based on the negative user cue, or responsive to the determination that the additional offensiveness measurement and the additional politeness measurement comply with the one or more criteria, modify the selected additional response candidate based on the negative user cue.

* * * * *

UNITED STATES PATENT AND TRADEMARK OFFICE
CERTIFICATE OF CORRECTION

PATENT NO. : 10,691,894 B2
APPLICATION NO. : 15/968685
DATED : June 23, 2020
INVENTOR(S) : Erika Doggett Page 1 of 1

It is certified that error appears in the above-identified patent and that said Letters Patent is hereby corrected as shown below:

In the Claims

Column 8, Claim 17, Line 53, please insert --;-- after candidate;

Column 8, Claim 17, Line 59, please delete "the natural" and insert --a natural--;

Column 9, Claim 17, Line 6, please insert --;-- after candidate.

Signed and Sealed this
Eighteenth Day of August, 2020

Andrei Iancu
*Director of the United States Patent and Trademark Office*